United States Patent
Aldridge et al.

(10) Patent No.: US 6,791,209 B2
(45) Date of Patent: Sep. 14, 2004

(54) POWER AND CONTROL FOR POWER SUPPLY FANS

(75) Inventors: Tomm V. Aldridge, Olympia, WA (US); Casey R. Winkel, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 10/038,160

(22) Filed: Jan. 2, 2002

(65) Prior Publication Data

US 2003/0122430 A1 Jul. 3, 2003

(51) Int. Cl.[7] .................................................. H02J 7/00
(52) U.S. Cl. .................. 307/65; 307/140; 307/116; 307/117
(58) Field of Search ................ 307/116, 117, 307/140, 65; 361/160; 340/635; 713/300; 702/64

(56) References Cited

U.S. PATENT DOCUMENTS

| | | | |
|---|---|---|---|
| 4,203,319 A | 5/1980 | Lechler | |
| 4,278,881 A | 7/1981 | Mann | |
| 4,428,719 A | 1/1984 | Hayashibara et al. | |
| 4,434,389 A | 2/1984 | Langley et al. | 318/254 |
| 4,550,267 A | 10/1985 | Vaidya | |
| 4,618,806 A | 10/1986 | Grouse | 318/254 |
| 4,738,336 A | 4/1988 | Smith et al. | |
| 5,008,561 A | 4/1991 | Madeley et al. | |
| 5,258,676 A | 11/1993 | Reinhardt et al. | 310/112 |
| 5,572,403 A | 11/1996 | Mills | 361/695 |
| 5,577,924 A | 11/1996 | Louwagie | |
| 5,745,041 A * | 4/1998 | Moss | 340/635 |
| 5,963,887 A * | 10/1999 | Giorgio | 702/64 |
| 6,166,469 A | 12/2000 | Osama et al. | |
| 6,646,851 B1 * | 11/2003 | Gudat | 361/160 |
| 2002/0004913 A1 * | 1/2002 | Fung | 713/300 |

FOREIGN PATENT DOCUMENTS

| | | |
|---|---|---|
| DE | 29 47 937 A1 | 11/1981 |
| DE | 43 04 818 A1 | 8/1994 |
| WO | WO 83/04436 | 12/1983 |
| WO | WO 94/14226 | 6/1994 |

OTHER PUBLICATIONS

PCT application No. PCT/US02/41554 Written Opinion mailed Mar. 22, 2004 in counterpart PCT applications.
PCT application No. PCT/US02/41553 Written Opinoin mailed Apr. 2, 2004 in counterpart PCT application.
PCT International Search Report dated Oct. 6, 2003(Jun. 10, 2003), related to International Application No. PCT/US 02/41554 (5pgs.).

* cited by examiner

*Primary Examiner*—Robert DeBeradinis
(74) *Attorney, Agent, or Firm*—Blakely, Sokoloff, Taylor & Zafman LLP

(57) ABSTRACT

A device is presented having at least one power supply. The power supply is connected to a power supply fan. A first power source terminal is connected to the at least one power supply. A second power source terminal is connected to the at least one power supply. The power supply fan is powered from a source external to the at least one power supply.

24 Claims, 6 Drawing Sheets

POWER AND CONTROL FOR POWER SUPPLY FANS

BACKGROUND OF THE INVENTION

1. Field of the Invention

This invention relates power supply fans, and more particularly to providing control and power for power supply fans.

2. Description of the Related Art

As electronic devices, such as microprocessors, central processing units (CPUs), servers, and other similar types of electronic components become faster and are reduced in size, power consumed within the system per unit volume (power density) increases dramatically. Therefore, it is essential to dissipate the heat generated by electronic components within the system during its operation to keep the electronic components within their normal operating temperature ranges. If the electronic components operate outside of their operating temperature ranges, the life span of the electronic components will be reduced or fail immediately.

One effective technique for dissipating the heat from electronic components, such as a power supply, is to provide an internal fan, or fan assembly, to directly apply a relatively high-velocity air stream across the surface of the electronic components. By forcing high-velocity air across the surface of the internal component(s), the conductive heat transfer coefficient for the surface of the internal electronic components is increased, thus increasing the convection cooling.

Current technology for power supplies has the power supply providing power internally for the internal or attached fans. Power supplies can fail if the cooling fan fails, leading to overheating of electronic components, or the electronic components can fail themselves. If the power supply fails, it follows that the power supply fan shuts off since there will not be any power supplied to sustain operation of the fan.

In many systems today, such as server systems, power is supplied to internal components from alternate sources besides the power supply. Moreover, in these systems, the power supply fans may be used to cool other components besides the power supply itself. When a power supply fan fails due to the power supply failing, the internal system's components may reach an over temperature situation. In the over temperature situation, components can be exposed to harm due to exceeding the operating temperature range. Further, if the system uses other fans, these fans may need to increase their speed in order to makeup for the loss of the power supply fan. In this case, acoustical noise is increased due to the higher fan speed of the system fans.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to providing external power to power supply fans. Referring to the figures, exemplary embodiments of the invention will now be described. The exemplary embodiments are provided to illustrate the invention and should not be construed as limiting the scope of the invention.

Figure 1:
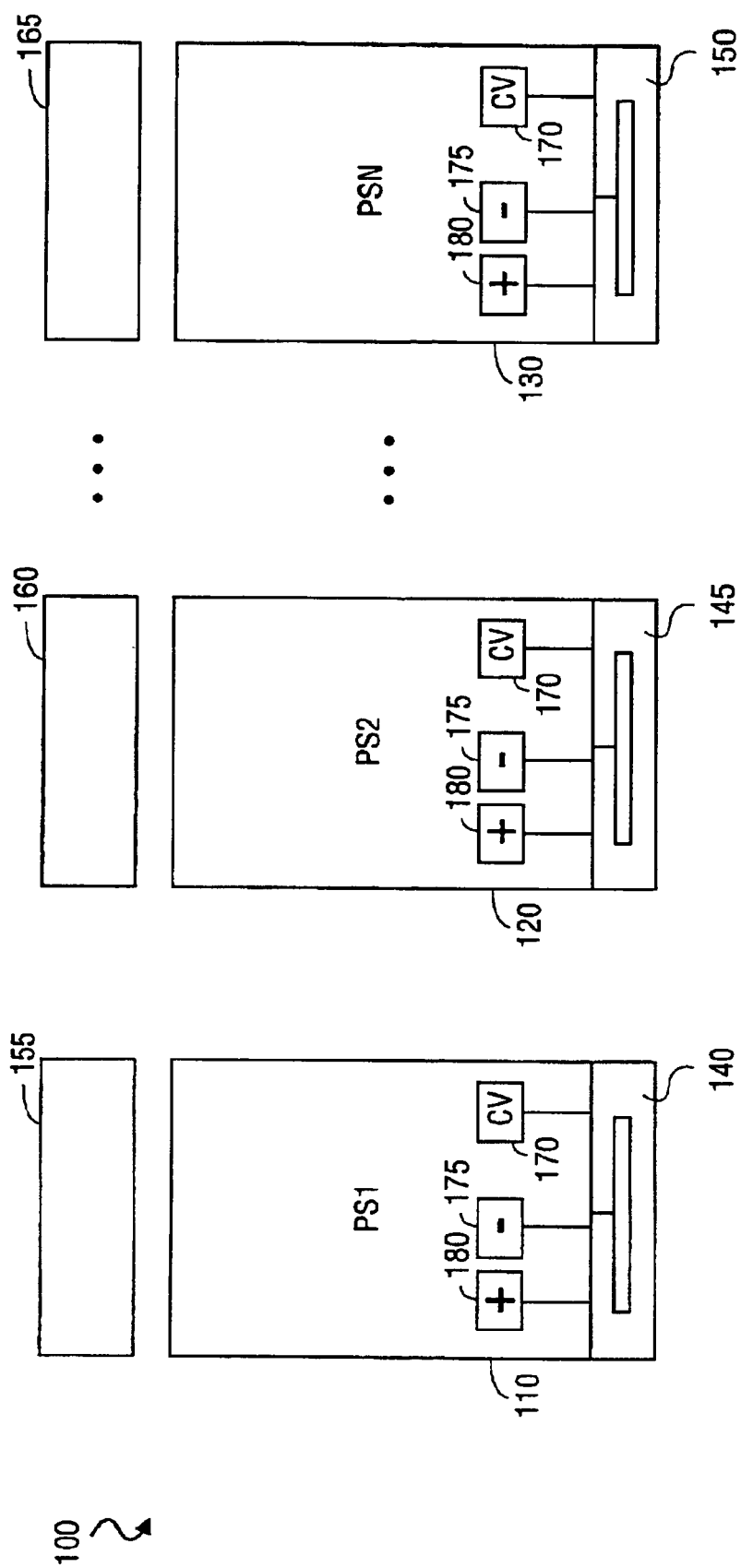
FIG. 1 illustrates a typical set of power supply fans each internally powering a power supply fan.

FIG. 1 illustrates a typical set of power supplies that are used for supplying power to a device or system. Power supply set 100 includes power supply 1 110, power supply 2 120 and power supply N 130. Each power supply in power supply set 100 includes an internal or attached power supply fan. Power supply 1 110 is coupled with power supply fan 140, power supply 2 120 is coupled with power supply fan 135 and power supply N 130 is coupled with power supply fan 150. Each power supply in power supply set 100 has positive voltage connector 180 and negative voltage connector 175. Positive voltage connector 180 and negative voltage connector 175 supply power to each of the power supply fans (power supply fan 140, 145 and 150). The power supplied to each of the power supply fans in power supply set 100 is internal to the specific power supply, i.e. power is supplied directly from the power supply itself. Each power supply fan has its speed controlled by an internal fan speed controller within each power supply (denoted as 170 in power supply 1 110, power supply 2 120 and power supply N 130 illustrated in FIG. 1).

Each power supply fan in power supply set 100 is used to provide cooling for the power supply itself and may also provide cooling for additional electronic components. As illustrated in FIG. 100, power supply 1 110 is associated with electronic component 155, power supply 2 145 is associated with electronic device 160 and power supply N 130 is associated with electronic component 165. The associated electronic component (155, 160 and 165) may be a device such as discrete power converter, etc. When one power supply in power supply set 100 fails, the associated fan (power supply fans 140, 145 and 150) also fails since they are powered directly by the associated power supply. Since an associated electronic device (electronic device 155, 160 and 165) relies on cooling from the fan powered by its associated power supply, an overheating situation can result from the loss of fan cooling due to power supply failure.

Figure 2:
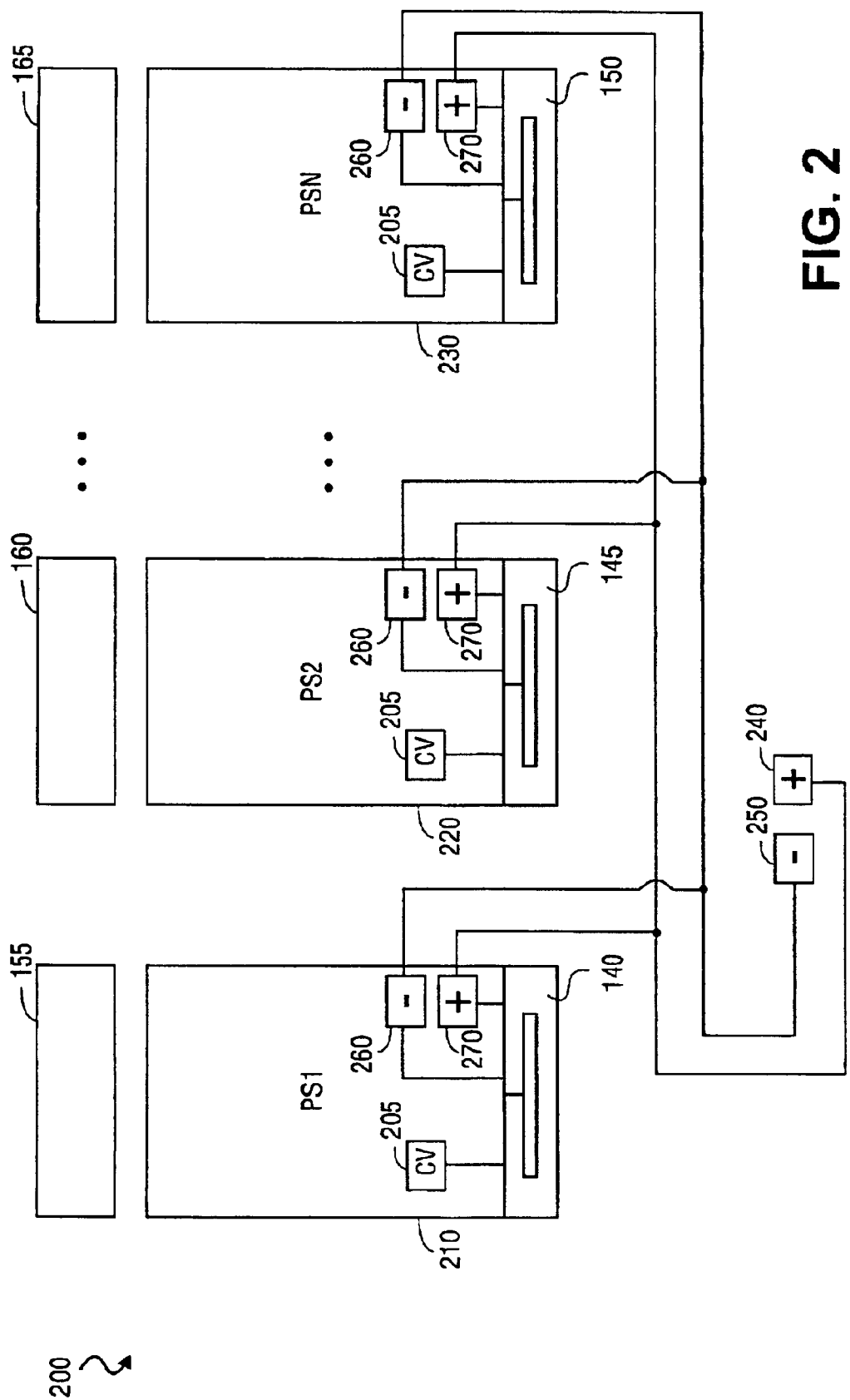
FIG. 2 illustrates an embodiment including system level power for power supply fans.

FIG. 2 illustrates an embodiment including system level supplied power for each power supply fan in a set of power supplies. Power supply set 200 includes power supply 1 210, power supply 2 220 and power supply N 230. Power supply 1 210, power supply 2 220 and power supply N 230 each include positive voltage connector 270, negative voltage connector 260 and internal fan speed controller 205. Internal fan speed controller 205 controls fan motor speed. Fan speed controller 205 uses a known technique to control fan speed, such as pulse width modulation (PWM), voltage/resistance variation, thermal speed control, etc. Fan speed controller 205 can also use a tachometer or other known techniques for fan rotation velocity feedback.

In power supply set 200, power is provided for fans 140, 145 and 150 via positive system voltage source 240 and negative system voltage source 250. One should note that a single positive system voltage source can be used if grounding is provided for by another source, such as by each of the power supplies, a common ground, etc. By using system level power to supply fans 140, 145 and 150 with power, if any of the power supplies in power supply set 200 fail, the associated power supply fan remains provided with power. Therefore, each power supply fan within power supply set 200 can each still provide fan cooling to an associated electronic device or other electronic components situated within the vicinity of the failed power supply.

Each power supply in power supply set 200 control the associated fan's speed via fan speed controller 205. In the case of power supply failure, power supply fan speed controller 205 will not function. Therefore, in one embodiment each power supply in power supply set 200 maintains an intermediate setting (minimum voltage required for an intermediate value; e.g., 2.5 Volts when the range is 0 to 5 Volts) for fan speed in the case of power supply failure. The intermediate fan speed setting can be preset by a device, such as a dip setting, potentiometer setting or electronic connection. When an associated fan (e.g., fan 140, 145 and 150) senses that fan speed controller 205 is failed (e.g., senses a failed condition such as zero volts) the fan speed will be set to this intermediate value and remain steady at the intermediate fan speed value in order to cool any associated electronic components or electronic component situated in the vicinity of the fan.

Figure 3:
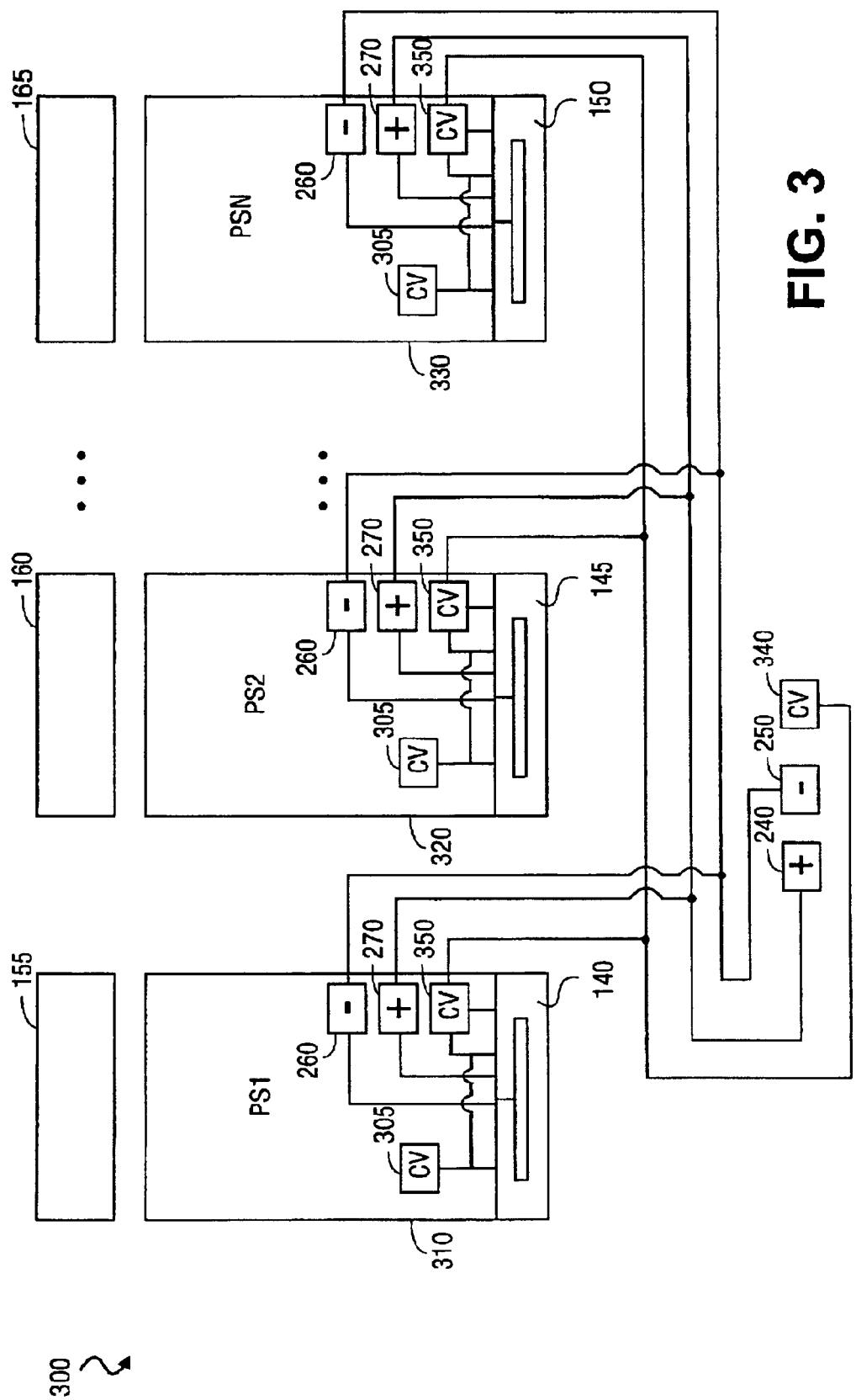
FIG. 3 illustrates an embodiment including system level power and speed control for power supply fans.

FIG. 3 illustrates an embodiment including system level power and speed control for power supply fans in a power supply set. In this embodiment, power supply fans in power supply set 300 are supplied with system level power from positive system voltage source 240 and negative system voltage source 250. Positive system voltage source 240 and negative system voltage source 250 reside on/in a system, such as a server system. Power supply fan speed is controlled by both internal power supply fan speed controller 305 and/or system fan speed controller 340, which is coupled with fan speed controller terminal 350. Internal fan speed controller 305 and system fan speed controller 340 control fan motor speed. Fan speed controller 305 and system fan speed controller 340 use a known technique to control fan speed, such as pulse width modulation (PWM), voltage/resistance variation, thermal speed control, etc. Fan speed controller 305 and system fan speed controller 340 can also use a tachometer or other known techniques for fan rotation velocity feedback.

Internal power supply fan speed controller 305 works with system fan speed controller 340 to control an associated fan (power supply fan 140, 145 and 150). Internal power supply fan speed controller 305 can increase fan speed over the level set by system fan speed controller 340, but can not lower the set fan speed set by system fan speed controller 340.

If a power supply fails in power supply set 300, since each power supply fan in power supply set 300 has power supplied by a source external to the failed power supply, the power supply fan remains operating to provide cooling to associated electronic components or electronic components situated in the vicinity of the power supply. In this embodiment, upon failure of the power supply, fan speed is controlled by system fan speed controller 340. One should note that while FIG. 3 illustrates a common connection for positive system voltage source 240, negative system voltage source 250 and system fan speed controller 340, that individual connections to each power supply in power supply set 300 can be used instead of common connections.

Figure 4:
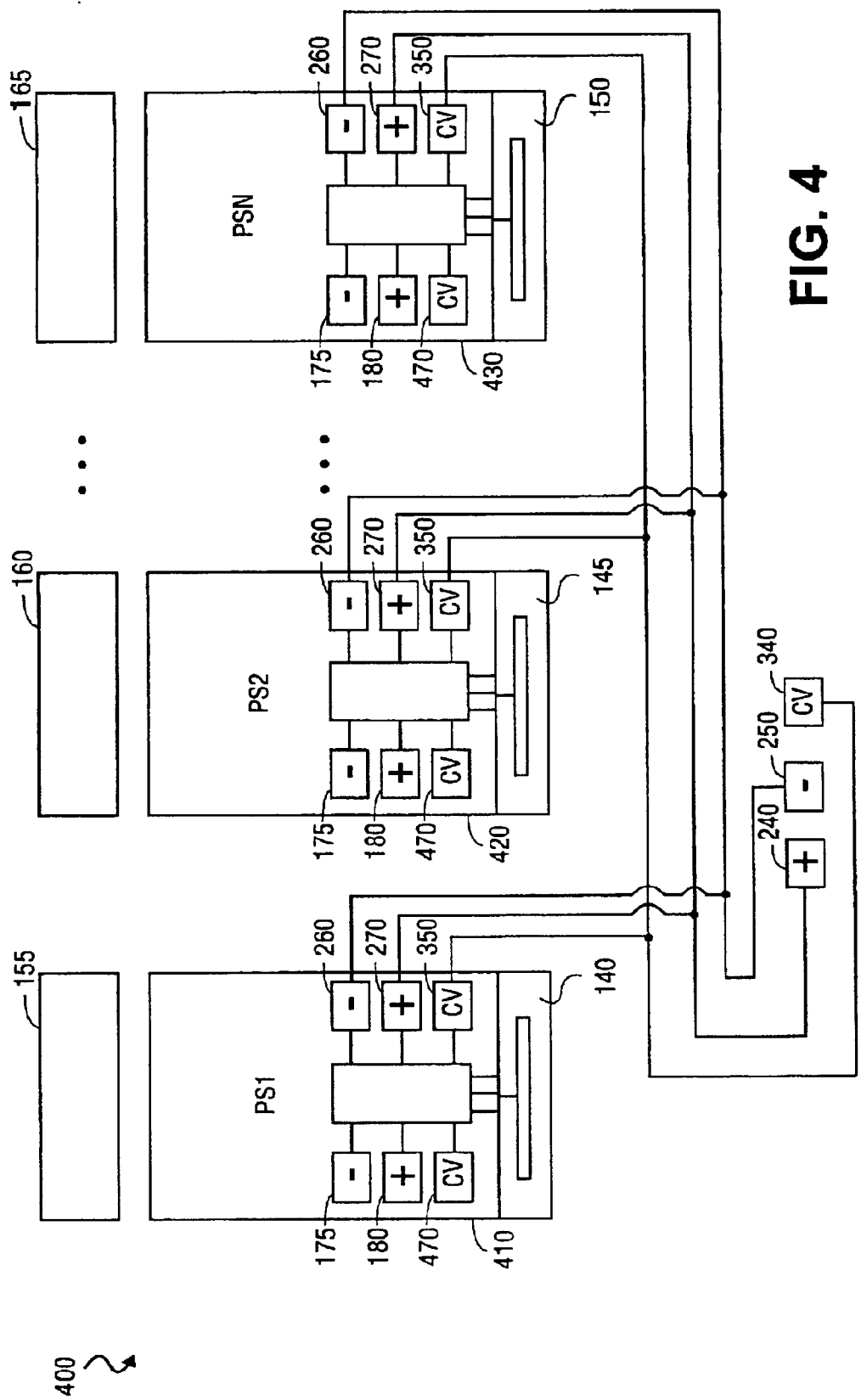
FIG. 4 illustrates an embodiment including a switch to provide system level power and speed control for a system.

FIG. 4 illustrates an embodiment including a switch to select power control and fan speed control between two sources for a power supply fan. Each power supply in power supply set 400 includes a switch 450 to switch between system power provided by positive system voltage source 240 and negative system voltage source 250 and internal power supplied from the power supply to a positive terminal 180 and a negative terminal 175. Also, power supply fan speed control can be switched between internal power supply fan speed control 470 and system fan speed control 340 (connected to fan speed controller terminal 350) via switch 450.

Switch 450, upon sensing a power supply failing (e.g., loss of power), switches over to system power supplied by positive system voltage source 240 and negative system voltage source 250, and switches fan speed control to fan speed controller 340. One should note that switch 450 can contain separate switches, separate coupled switches, or a single switch. Also, switch 450 can use any switch technology, such as transistor, electronic, etc.

In one embodiment, switch 450 senses voltage and switches over to system control upon falling below a necessary voltage threshold to power a power supply fan, such as a 12-volt threshold. In another embodiment, switch 450 can sense a current threshold from current supplied internal to a power supply, such as 1 amp. Once the internal power supply's current falls below the current threshold, switch 450 switches over to system power and fan speed control. In still another embodiment, switch 450 has a thermal sensor and switches over to system control once it senses a certain temperature threshold that can be user adjusted. In this embodiment, the associated power supply can be turned off (via switch 450) and still be afforded cooling by the associated power supply fan operating under system control. An alarm or signal can also be sounded/transmitted from switch 450 to the system via a transmission medium, such as a signal bus or wire, to alarm/inform of a temperature problem at the power supply. This would allow maintenance to replace or repair the power supply that is overheating.

By using switch 450, if the power supplies in power supply set 400 fail, power supply fans 140, 145 and 150 remain operating via system provided power and system provided fan speed control. Therefore, electronic components relying on cooling by power supply fans (such as electronic component 155, 160 and 165) can avoid damage from an overheating condition. Further, since the power supply's internal or attached fan remains operating in a failed power supply, other fans within the system can remain at their current fan speed. Thus, acoustical noise is reduced by not having to increase fan speed of remaining power supply fans in order to make up a cooling loss from a failed power supply and its associated fan.

In one embodiment, an electrical connector to connect negative terminal 175, positive terminal 180 and fan speed control 470 connects a power supply to a power supply fan (e.g., power supply fan 140, 145 and 150) in power supply set 400. This power supply can be disconnected, which will switch fan power over to negative voltage terminal 260 and positive voltage terminal 270. Also, fan speed control is switched to fan speed controller terminal 350. Therefore, this embodiment allows maintenance of a power supply without having to shutdown a complete system. Also, fan cooling is continued while the power supply is being replaced. Thus, in cases such as "hot" swapping or replacing failed power supplies, cooling efficiency is not reduced. Further, acoustical noise is not increased since other fans need not increase fan speed to compromise for a loss of a power supply fan.

Figure 5:
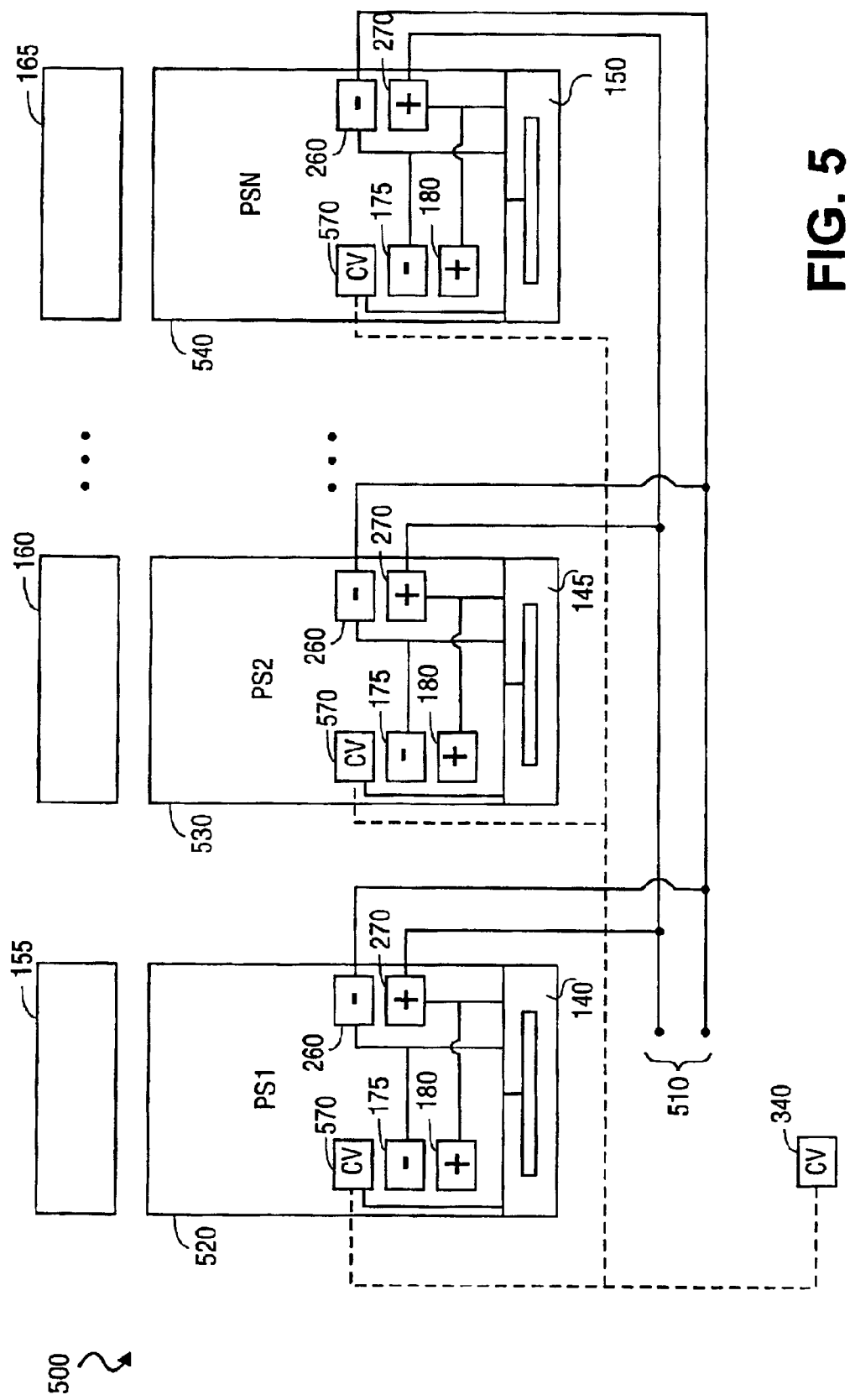
FIG. 5 illustrates an embodiment including a power supply power bus for providing shared power to power supply fans.

FIG. 5 illustrates an embodiment having a power supply power bus for providing shared power to power supply fans. In this embodiment, each power supply (power supply 1 520, power supply 2 530 and power supply N 540) in power supply set 500 has positive voltage terminal 270 and negative voltage terminal 260 coupled with a power supply bus 510. Each power supply in power supply set 500 also supplies power internally to an associated power supply fan (power supply fan 140, 145 and 150). Positive voltage terminal 270 and negative voltage terminal 260 are coupled in parallel with negative terminal 175 and positive terminal 180 for each power supply in power supply set 500. Therefore, if a power supply in power supply set 500 fails, (i.e., loss of internal power to provide to a power supply fan), the associated power supply fan will remain in operation by receiving necessary power from power bus 510.

Since every power supply in a power supply set (e.g., power supply 1 520, power supply 2 530 and power supply fan 540 within power supply set 500) has its internal power source coupled with positive voltage terminal 270 and negative voltage terminal 260 in parallel, and each power supply has its positive voltage terminal 270 and negative voltage terminal 260 coupled in parallel with power supply bus 510, if one power supply within power supply set 500 fails, the non-failing power supplies will have their power supply fans provided with sufficient power to continue operating.

In one embodiment, each power supply in power supply set 500 controls an associated fan's speed via fan speed controller 570. In the case of power supply failure, power supply fan speed controller 570 will not function. Therefore, in one embodiment each power supply in power supply set 500 maintains an intermediate setting (minimum voltage required for an intermediate value; e.g., 2.5 Volts when the range is 0 to 5 Volts) for fan speed in the case of power supply failure. The intermediate fan speed setting can be preset by a device, such as a dip setting, potentiometer setting or electronic connection. When an associated fan (e.g., fan 140, 145 and 150) senses that fan speed controller 570 is failed (e.g., senses a failed condition such as zero volts) the fan speed will be set to this intermediate value and remain steady at the intermediate fan speed value in order to provide cooling to any associated electronic components or electronic component situated in the vicinity of the fan.

In one embodiment, fan speed control is provided by system fan speed controller 340. In this embodiment, if a power supply fails, not only will the power supply fan be provided with power from power supply bus 510, but each power supply fan will also be provided with fan speed control from system fan speed controller 340. In one embodiment, internal fan speed control 570 has the capability to increase a power supply fan's fan speed, but cannot decrease fan speed set by system fan speed controller 340.

Figure 6:
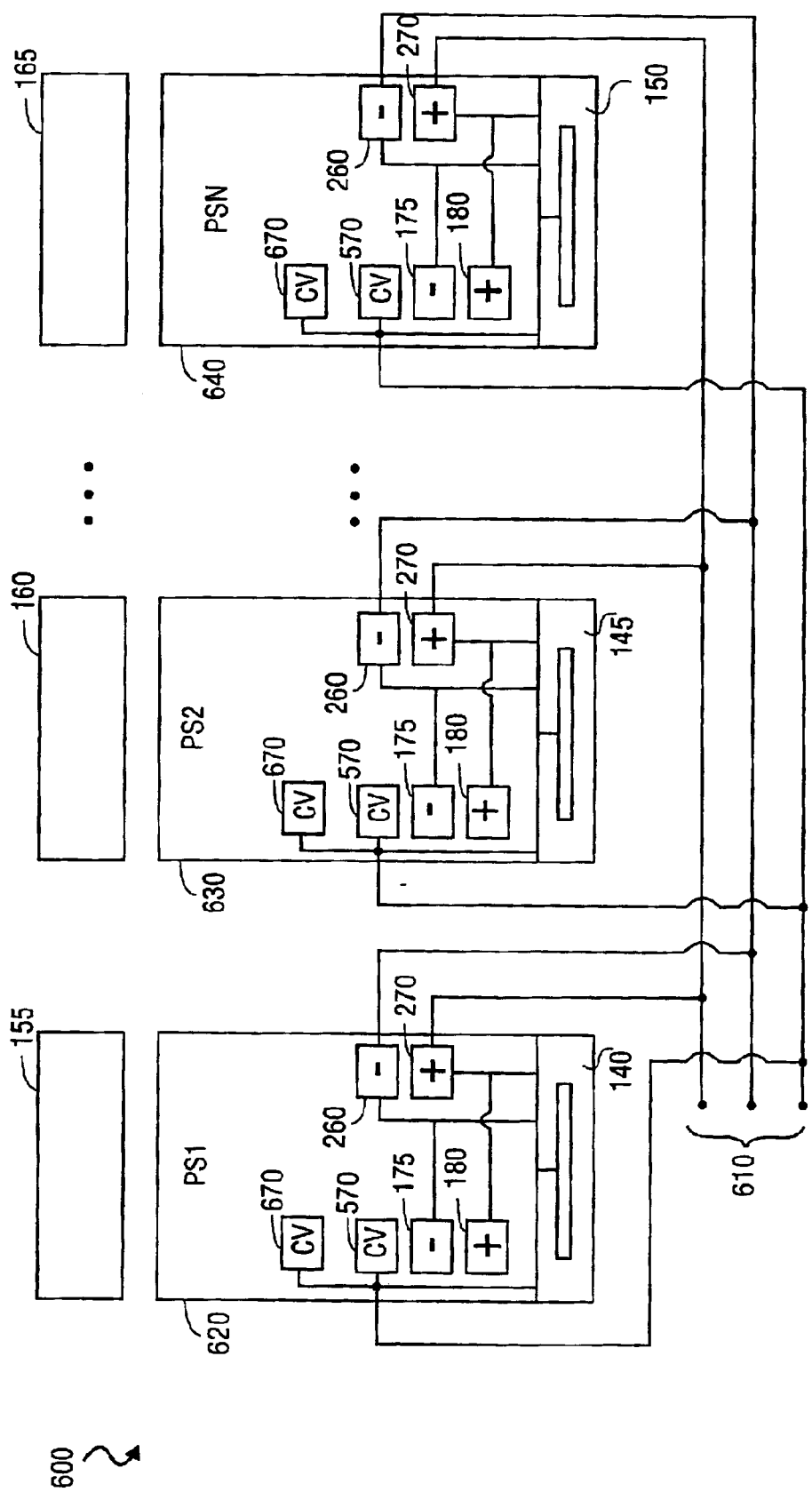
FIG. 6 illustrates an embodiment including a power supply power and control bus for providing shared power to power supply fans.

FIG. 6 illustrates an embodiment having a power supply power and control bus for providing shared power to power supply fans. In this embodiment, each power supply (power supply 1 620, power supply 2 630 and power supply N 640) in power supply set 600 has positive voltage terminal 270 and negative voltage terminal 260 coupled with power supply power and control bus 610. Each power supply in power supply set 600 also supplies power internally to an associated power supply fan (power supply fan 140, 145 and 150). Positive voltage terminal 270 and negative voltage terminal 260 are coupled in parallel with negative terminal 175 and positive terminal 180 for each power supply in power supply set 600. Therefore, if a power supply in power supply set 600 fails, (i.e., loss of internal power to provide to a power supply fan), the associated power supply fan will remain in operation by receiving necessary power from power supply power and control bus 610.

Since every power supply in a power supply set (e.g., power supply 1 620, power supply 2 630 and power supply fan 640 within power supply set 600) has its internal power source coupled with positive voltage terminal 270 and negative voltage terminal 260 in parallel, and each power supply has its positive voltage terminal 270 and negative voltage terminal 260 coupled in parallel with power supply power and control bus 610, if one power supply within power supply set 600 fails, the non-failing power supplies will have their power supply fans provided with sufficient power to continue operating.

In one embodiment, each power supply in power supply set 600 controls an associated fan's speed via fan speed controller 570. In the case of power supply failure, power supply fan speed controller 570 will not function. Therefore, each power supply in power supply set 600 has power supply fan speed controller 670 coupled in parallel to power supply power and control bus 610, and power supply fan speed controller 570. When an associated fan (e.g., fan 140, 145 and 150) senses that fan speed controller 570 is failed (e.g., senses a failed condition such as zero volts) the fan speed will be set by a voltage supplied by power supply power and control but 610 in order to provide cooling to any associated electronic components or electronic component situated in the vicinity of the fan. Since fan speed control voltage is in a specific range (e.g., between 0 and 5 Volts), fan speed controller 670 sets fan speed according to the average voltage value from non-failed fan speed controllers 570 in the power supplies coupled to power supply power and control bus 610.

In one embodiment, each power supply in power supply set 600 maintains an intermediate setting (minimum voltage required for an intermediate value; e.g., 2.5 Volts when the range is 0 to 5 Volts for fan speed in the case of complete power supply failure (i.e., all power supplies in power supply set 600 fail). The intermediate fan speed setting can be preset by a device, such as a dip setting, potentiometer setting or electronic connection. When an associated fan (e.g., fan 140, 145 and 150) senses that fan speed controller 670 is failed (e.g., senses all fan speed controllers are failed) the fan speed will be set to this intermediate value and remain steady at the intermediate fan speed value in order to provide cooling to any associated electronic components or electronic component situated in the vicinity of the fan.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   at least one power supply, the at least one power supply coupled to a power supply fan,
   a first power source terminal coupled to the at least one power supply,
   a second power source terminal coupled to the at least one power supply, and a fan speed controller coupled internally to the at least one power supply, wherein the power supply fan is powered from a source external to the at least one power supply, and said power supply fan is set to an intermediate setting independent of said fan speed controller when said power supply fails.

2. The apparatus of claim 1, wherein the power supply fan continues to operate upon the at least one power supply failing.

3. The apparatus of claim 1, wherein the source provides a voltage to the power supply fan upon the at least one power supply failing.

4. The apparatus of claim 1, wherein the source is a server, the at least one power supply providing a portion of power to the server.

5. An apparatus comprising:
at least one power supply, the at least one power supply coupled to a power supply fan,
a first fan speed controller and a second fan speed controller both coupled to the power supply fan, the first fan speed controller internally coupled to the at least one power supply, the second fan speed controller provides fan speed control for the power supply fan upon the at least one power supply failing,
a first power source terminal coupled to the at least one power supply,
a second power source terminal coupled to the at least one power supply,
a fan speed controller terminal coupled to the power supply fan and the first fan speed controller,
wherein the power supply fan is powered from an external source to the at least one power supply, the first fan speed controller and the second fan speed controller provide fan speed control for the power supply fan simultaneously and the first fan speed controller can increase fan speed by overriding the second fan speed controller.

6. The apparatus of claim 5, wherein the power supply fan continues to operate upon the at least one power supply failing.

7. The apparatus of claim 5, wherein the first fan speed controller is powered by the at least one power supply.

8. The apparatus of claim 5, wherein the second fan speed controller is external to the at least one power supply.

9. The apparatus of claim 5, wherein the external source is a server, the at least one power supply providing a portion of power to the server.

10. An apparatus comprising:
at least one power supply, the at least one power supply coupled to a power supply fan,
a switch coupled to the power supply fan,
a first fan speed controller coupled to the switch, the first fan speed controller powered by the at least one power supply,
a first internal power source terminal coupled to the switch,
a second internal power source terminal coupled to the switch,
an external fan speed controller terminal coupled to the switch,
a second fan speed controller coupled the external fan speed controller terminal, the second fan speed controller provides fan speed control for the power supply fan upon the at least one power supply failing,
a first external power source terminal coupled to the switch, and a second external power source terminal coupled to the switch, wherein power to operate the power supply fan is switched to an external source upon the at least one power supply failing, and the first fan speed controller and the second fan speed controller provide fan speed control for the power supply fan simultaneously and the first fan speed controller can increase fan speed by overriding the second fan speed controller.

11. The apparatus of claim 10, wherein the switch senses a change in voltage and switches fan speed control to the second fan speed controller upon sensing voltage dropping below a voltage threshold.

12. The apparatus of claim 11, wherein the power supply can be uncoupled from the power supply fan and the switch switches power from the power supply to the external source to continue power to the power supply fan.

13. The apparatus of claim 11, wherein the second fan speed controller is external to the at least one power supply.

14. The apparatus of claim 10, wherein the external source is a server, the at least one power supply providing a portion of power to the server.

15. The apparatus of claim 10, wherein the external source is coupled to the first and the second external power source terminals.

16. The apparatus of claim 10, further comprising:
a transmission medium coupled to the switch, wherein the switch transmits a signal on the transmission medium upon sensing the at least one power supply failing.

17. An apparatus comprising:
a plurality of power supplies, the plurality of power supplies each coupled to a separate power supply fan,
each individual power supply of the plurality of power supplies including:
an internal fan speed controller coupled to the separate power supply fan,
the fan speed controller powered by the individual power supply,
a first power source terminal coupled to the individual power supply,
a second power source terminal coupled to the individual power supply, and
a fan speed controller coupled to the separate power supply fan,
wherein the separate power supply fan receives power from the plurality of power supplies, and each power supply fan is set to an intermediate fan speed setting independent of said fan speed controller when the associated power supply fails.

18. The apparatus of claim 17, further including:
a power supply power bus coupled to the plurality of power supplies.

19. The apparatus of claim 17, wherein the power supply fan continues to operate upon the individual power supply failing.

20. The apparatus of claim 17, wherein the fan speed controller is powered by the individual power supply.

21. The apparatus of claim 17, further including:
a fan speed controller terminal coupled to the fan speed controller, and
an external fan speed controller coupled to the fan speed controller terminal.

22. The apparatus of claim 21, wherein the external fan speed controller provides speed control for the power supply fan upon the individual power supply failing, and the fan speed controller and the external fan speed controller provide fan speed control for each power supply fan simultaneously and the fan speed controller can increase fan speed by overriding the external fan speed controller.

23. The apparatus of claim 17, wherein each fan speed controller of the plurality of power supplies is coupled to a fan speed control bus.

24. The apparatus claim 23, wherein non-failed power supplies of the plurality of power supplies provide a voltage to the power supply fan upon the individual power supply failing, the voltage controlling the power supply fan's speed.

* * * * *